United States Patent
Allen et al.

(10) Patent No.: US 10,538,696 B2
(45) Date of Patent: Jan. 21, 2020

(54) PROPPANT AND METHODS OF USING THE SAME

(71) Applicant: Southwestern Energy Company, Spring, TX (US)

(72) Inventors: Thomas Allen, Tomball, TX (US); Karen Olson, Spring, TX (US)

(73) Assignee: Southwestern Energy Company, Spring, TX (US)

( * ) Notice: Subject to any disclaimer, the term of this patent is extended or adjusted under 35 U.S.C. 154(b) by 0 days.

(21) Appl. No.: 15/542,483

(22) PCT Filed: Jan. 11, 2016

(86) PCT No.: PCT/US2016/012869
§ 371 (c)(1),
(2) Date: Jul. 10, 2017

(87) PCT Pub. No.: WO2016/115038
PCT Pub. Date: Jul. 21, 2016

(65) Prior Publication Data
US 2018/0273835 A1    Sep. 27, 2018

Related U.S. Application Data

(60) Provisional application No. 62/188,840, filed on Jul. 6, 2015, provisional application No. 62/102,846, filed (Continued)

(51) Int. Cl.
*C09K 8/80* (2006.01)
*C09D 171/12* (2006.01)
(Continued)

(52) U.S. Cl.
CPC ............ *C09K 8/805* (2013.01); *B01J 13/04* (2013.01); *B01J 13/20* (2013.01); *C09D 171/12* (2013.01);
(Continued)

(58) Field of Classification Search
None
See application file for complete search history.

(56) References Cited

U.S. PATENT DOCUMENTS 3,026,938 A    3/1962  Huitt et al.
3,155,162 A    11/1964 Flickinger et al.
(Continued)

FOREIGN PATENT DOCUMENTS

RU    2373253 C2    11/2008
RU    2478779 C2    10/2013
(Continued)

OTHER PUBLICATIONS

Extended European Search Report, EP Application No. 16737673.0, dated Jun. 12, 2018.
(Continued)

*Primary Examiner* — Jeffrey D Washville
(74) *Attorney, Agent, or Firm* — Nielsen IP Law LLC

(57) ABSTRACT

Provided herein are novel proppants for use in hydraulic fracturing. The proppant has a core substrate and a light-weight substrate. The light weight substrate comprises a plurality of composite particles; a filler material; and an adhesive. The filler material has a particle-distribution-size of about 5 percent to about 20 percent of the particle-distribution-size of the plurality of composite particles. Additional additives can be optionally added to light-weight substrate. The adhesive binds the light-weight substrate to the core substrate to produce the proppant having a specific gravity of about 1 g/cc. Proppant can travel with the carrier fluid in a frac fluid rather than settling out quickly or floating away.

14 Claims, 6 Drawing Sheets

Related U.S. Application Data on Jan. 13, 2015, provisional application No. 62/102,558, filed on Jan. 12, 2015.

(51) Int. Cl.

| | | |
|---|---|---|
| *B01J 13/04* | (2006.01) | |
| *B01J 13/20* | (2006.01) | |
| *C09K 8/68* | (2006.01) | |
| *C09K 8/66* | (2006.01) | |
| *C08K 3/36* | (2006.01) | |
| *C08K 3/40* | (2006.01) | |
| *C08K 7/20* | (2006.01) | |

(52) U.S. Cl.
CPC ............... *C09K 8/665* (2013.01); *C09K 8/68* (2013.01); *C08K 3/36* (2013.01); *C08K 3/40* (2013.01); *C08K 7/20* (2013.01); *C08K 2201/005* (2013.01)

(56) References Cited

U.S. PATENT DOCUMENTS

| | | | |
|---|---|---|---|
| 3,376,930 A | 4/1968 | Kiel et al. | |
| 3,399,727 A | 9/1968 | Graham et al. | |
| 3,929,191 A | 12/1975 | Graham et al. | |
| 4,493,875 A | 1/1985 | Beck et al. | |
| 4,654,266 A | 3/1987 | Kachnik | |
| 4,879,181 A | 11/1989 | Fitzgibbon | |
| 5,188,175 A | 2/1993 | Sweet | |
| 6,582,819 B2 | 6/2003 | McDaniel et al. | |
| 7,135,231 B1 | 11/2006 | Sinclair et al. | |
| 7,718,583 B2 | 5/2010 | Barmatov et al. | |
| 7,828,998 B2 | 11/2010 | Luscher et al. | |
| 8,063,000 B2 | 11/2011 | Wilson | |
| 8,216,675 B2 | 7/2012 | Palamara et al. | |
| 8,596,361 B2 | 12/2013 | Willberg et al. | |
| 8,603,578 B2 | 12/2013 | Smith et al. | |
| 8,931,553 B2 | 1/2015 | Cannan et al. | |
| 2005/0244641 A1 | 11/2005 | Vincent | |
| 2006/0065398 A1 | 3/2006 | Brannon et al. | |
| 2006/0258546 A1 | 11/2006 | Brannon et al. | |
| 2007/0087941 A1 | 4/2007 | Cawiezel | |
| 2007/0193746 A1 | 8/2007 | Brannon et al. | |
| 2007/0204992 A1 | 9/2007 | Davis et al. | |
| 2007/0209794 A1 | 9/2007 | Kaufman et al. | |
| 2008/0070774 A1 | 3/2008 | Shmotev et al. | |
| 2008/0179057 A1 | 7/2008 | Dawson | |
| 2008/0230223 A1 | 9/2008 | McCrary et al. | |
| 2008/0277115 A1 | 11/2008 | Rediger et al. | |
| 2009/0044942 A1 | 2/2009 | Gupta | |
| 2009/0178807 A1 | 7/2009 | Kaufman et al. | |
| 2010/0089580 A1 | 4/2010 | Brannon et al. | |
| 2010/0252262 A1 | 10/2010 | Ekstrand et al. | |
| 2011/0094740 A1 | 4/2011 | Stephenson et al. | |
| 2011/0180260 A1 | 7/2011 | Brannon et al. | |
| 2012/0018162 A1 | 1/2012 | Tanguay et al. | |
| 2012/0157358 A1 | 6/2012 | Fang et al. | |
| 2012/0227967 A1 | 9/2012 | Shaikh et al. | |
| 2012/0325473 A1 | 12/2012 | Bicerano | |
| 2013/0022816 A1 | 1/2013 | Smith et al. | |
| 2013/0068469 A1 | 3/2013 | Lin et al. | |
| 2013/0341030 A1 | 12/2013 | Brannon et al. | |
| 2014/0014338 A1 | 1/2014 | Crews et al. | |
| 2014/0196898 A1 | 7/2014 | Tanguay et al. | |
| 2014/0262247 A1 | 9/2014 | Duenckel et al. | |
| 2014/0318775 A1 | 10/2014 | Cannan et al. | |
| 2016/0333260 A1* | 11/2016 | Drake | C09K 8/805 |
| 2018/0044578 A1* | 2/2018 | Mahoney | E21B 43/267 |
| 2018/0273835 A1 | 9/2018 | Allen et al. | |

FOREIGN PATENT DOCUMENTS

| | | |
|---|---|---|
| WO | 2008141039 A1 | 11/2008 |
| WO | 2011/050046 A1 | 4/2011 |
| WO | 2012/051026 A2 | 4/2012 |
| WO | 2014144516 A1 | 9/2014 |
| WO | 2016115038 A1 | 7/2016 |

OTHER PUBLICATIONS

Kostenuk et al. Improved Proppant Transport System for Slickwater Shale Fracturing, Soc. Pet. Eng.—Can. Unconv. Resour. Int. Pet. Conf., 1-10 (2010).

dos Santos et al. Inverted-Convection Proppant Transport for Effective Conformance Fracturing. SPE Prod. Oper. 24:1:187-93 (2009).

3M Technical Data Bulletin #207: Hydraulic Fracturing, 3M (Jul. 2012).

3M Microspheres Selection Guide, 3M (2015).

Tres, P. Hollow Glass Microspheres Stronger Spheres Tackle Injection Molding, 3M (2007) available at https://www.ptonline.com/articles/hollow-glass-microspheres-stronger-spheres-tackle-injection-molding.

Ceno Technologies Hollow Glass Microspheres, Ceno Technologies (2011).

International Search Report and Written Opinion, PCT/US2016/012869 dated Mar. 18, 2016.

3M Glass Microspheres: Compounding and Injection Molding Guidelines, 3M (2008).

Australian Patent Examination Report 1, dated Mar. 28, 2019, corresponding to Australian Application No. 2016206998; 3 pages.

Russian Office Action and Search Report (with English translation), dated Aug. 14, 2019, corresponding to Russian Application No. 2017128653/03; 17 total pages.

* cited by examiner

PROPPANT AND METHODS OF USING THE SAME

CROSS REFERENCE TO RELATED APPLICATIONS

This application claims priority to U.S. Provisional Application No. 62/102,558 filed Jan. 12, 2015, and to U.S. Provisional Application 62/102,846 filed Jan. 13, 2015, and to U.S. Provisional Application No. 62/188,840 filed Jul. 6, 2015, the entirety of which are incorporated herein by reference.

STATEMENT REGARDING FEDERALLY SPONSORED RESEARCH OR DEVELOPMENT

None.

THE NAMES OF PARTIES TO A JOINT RESEARCH AGREEMENT

None.

BACKGROUND

Proppant is used in hydraulic fracturing operations and added to the fracturing fluid to keep an induced hydraulic fracture open, during or following a fracturing treatment. Proppants vary in composition depending on the type of operation and/or fracturing fluid used. Recently, there have been efforts to improve flow characteristics and chemical transport of proppant.

Notwithstanding the efforts made to improve proppant, the specific gravity of most proppant ranges between about 2.20 g/cc to about 3.67 g/cc, causing proppant to rapidly settle out and/or prematurely bridge off in the hydraulic fracture. For example, certain proppant have been pumped and coated with nitrogen to produce a thin surfactant coating that causes a layer of nitrogen to attach to particles of proppant. The nitrogen temporarily reduces the apparent specific gravity of the proppant and reportedly improves proppant transport by about 25%. Another proppant has been developed with a polymer coating that expands when hydrated. The coating effectively reduces the density of the proppant while it is being pumped. The polymer then dissolves with conventional breakers once it settles in the hydraulic fracture.

There is also high-drag proppant shaped like an "X" instead a sphere. The shape is designed to interlock with other particles to reduce proppant flow back and reportedly increases drag and reduces settling rates by about 27%. Further an in-situ proppant that is polymer-based fluid forms spherical particles within the fracture. Particles in this proppant are activated by catalysts and reservoir temperature.

Even viscous gels have been used to hold the conventional proppant in suspension. However, incomplete removal or cleanup of these complex gels injected into the formation cause significant formation damage by plugging up most of the created hydraulic fracture.

Attempts to improve proppant typically suffer from high cost and/or lack of compressive strength. To compensate for the high cost, the proppant can be pumped in very low concentrations to form a single, high conductivity layer (monolayer) on top of the "proppant pack" in an effort to increase well productivity. However, this approach has rarely proven to be commercially effective. As result, the ultra-light weight proppants are rarely pumped today for stimulating subterranean formations. Moreover, because of low compressive strength, commercial applications of these proppants are typically limited to shallow, low pressure formations.

A need exists, therefore, for proppant having new and improved properties in order to more effectively stimulate subterranean formations with far less environmental impact than is possible with the conventional proppant.

SUMMARY

Provided herein are novel proppants for use in hydraulic fracturing processes. The subject proppant comprises a core substrate and a light-weight substrate bound to the core substrate. The core substrate is sometimes also referred to herein as a heavy substrate. The light-weight substrate is often referred to herein as the light-weight coating or the "LWC." The light-weight substrate includes: (1) a plurality of composite particles; (2) a filler material; and (3) an adhesive. The composite particles and the filler material can each comprise a single type of material or can be two or more types of materials. The filler material can be the same material as the composite particles or be a different material. However, the filler material has a mean particle-distribution-size of about 5 percent to about 20 percent of the mean particle-distribution-size of the plurality of composite particles. The adhesive binds the light-weight substrate to the core substrate.

The components of the light-weight substrate (the composite particles, the filler material and the adhesive) are combined with the core substrate so to provide the proppant with a specific gravity of about 1.0 g/cc.

As described herein, subterranean formations can be more effectively stimulated by pumping neutral-weight proppants that will travel with the carrier fluid (typically water) instead of pumping heavier conventional proppants that will quickly settle out or ultra-light proppants that will float away. Hence, as provided herein, the proppant flows with an injected frac fluid without settling or floating away, and can significantly improve the efficiency of a carrier fluid without requiring excessive fluid velocities or viscosity-enhancing chemicals.

DETAIL DESCRIPTION OF THE FIGURES

Figure 7A:
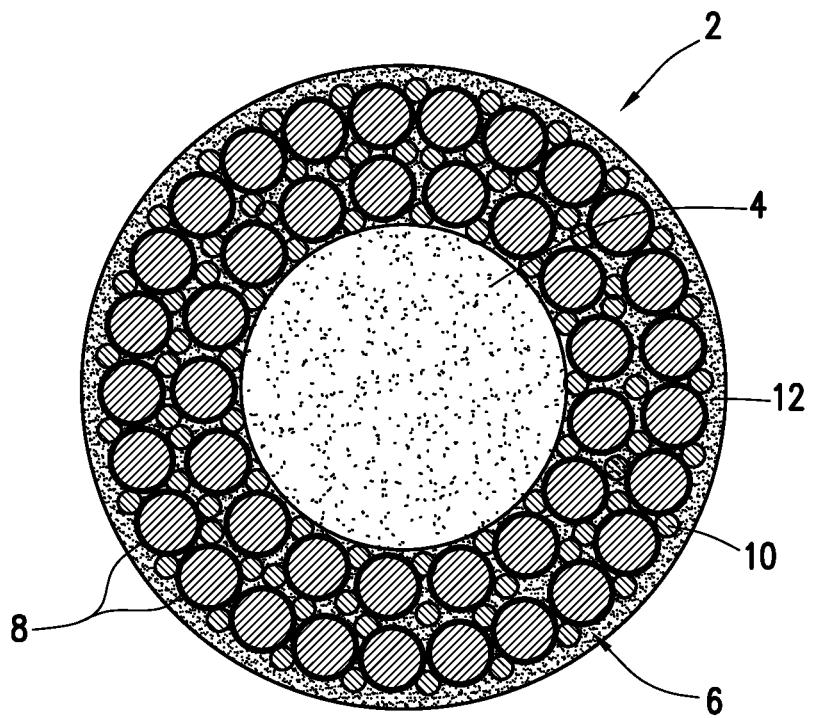
Figure 7B:
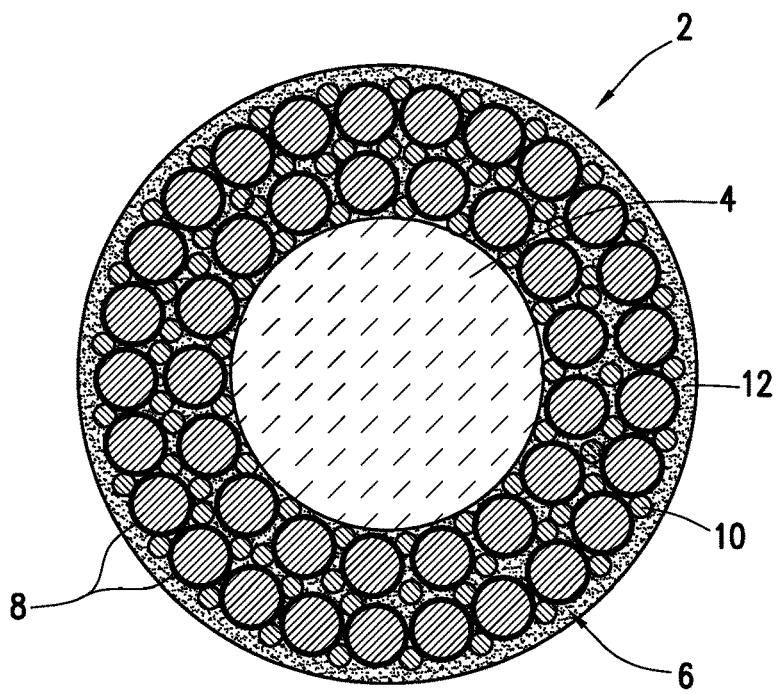
Figure 7C:
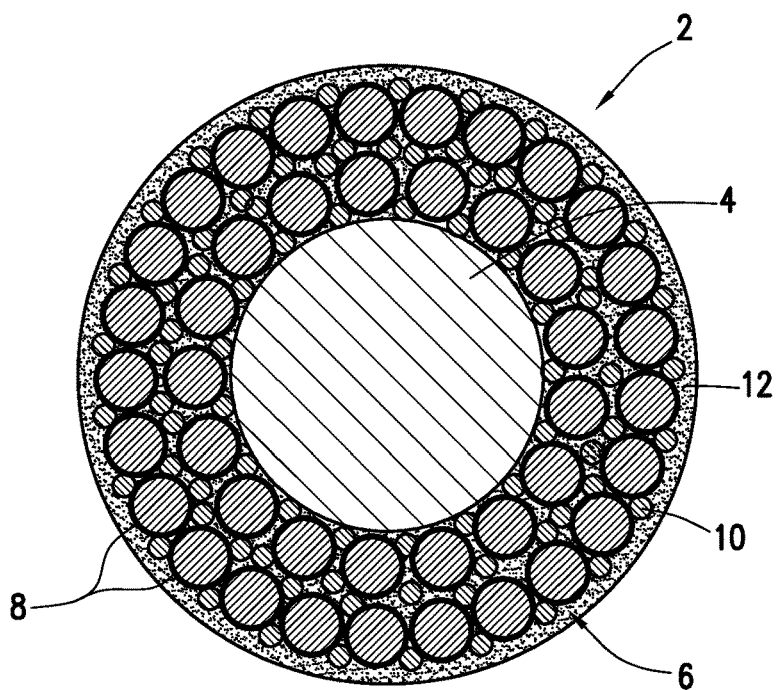

FIG. 7A is an illustration of an embodiment of the proppant described herein comprising sand, perlite material, diatomaceous earth and resin. FIG. 7B is an illustration of an embodiment of the proppant described herein containing intermediate strength ceramic, ceramic flour, diatomaceous earth and resin. FIG. 7C is an illustration of an embodiment of the proppant described herein containing bauxite, bauxite, diatomaceous earth and resin.

DETAIL DESCRIPTION OF THE INVENTION

Figure 1:
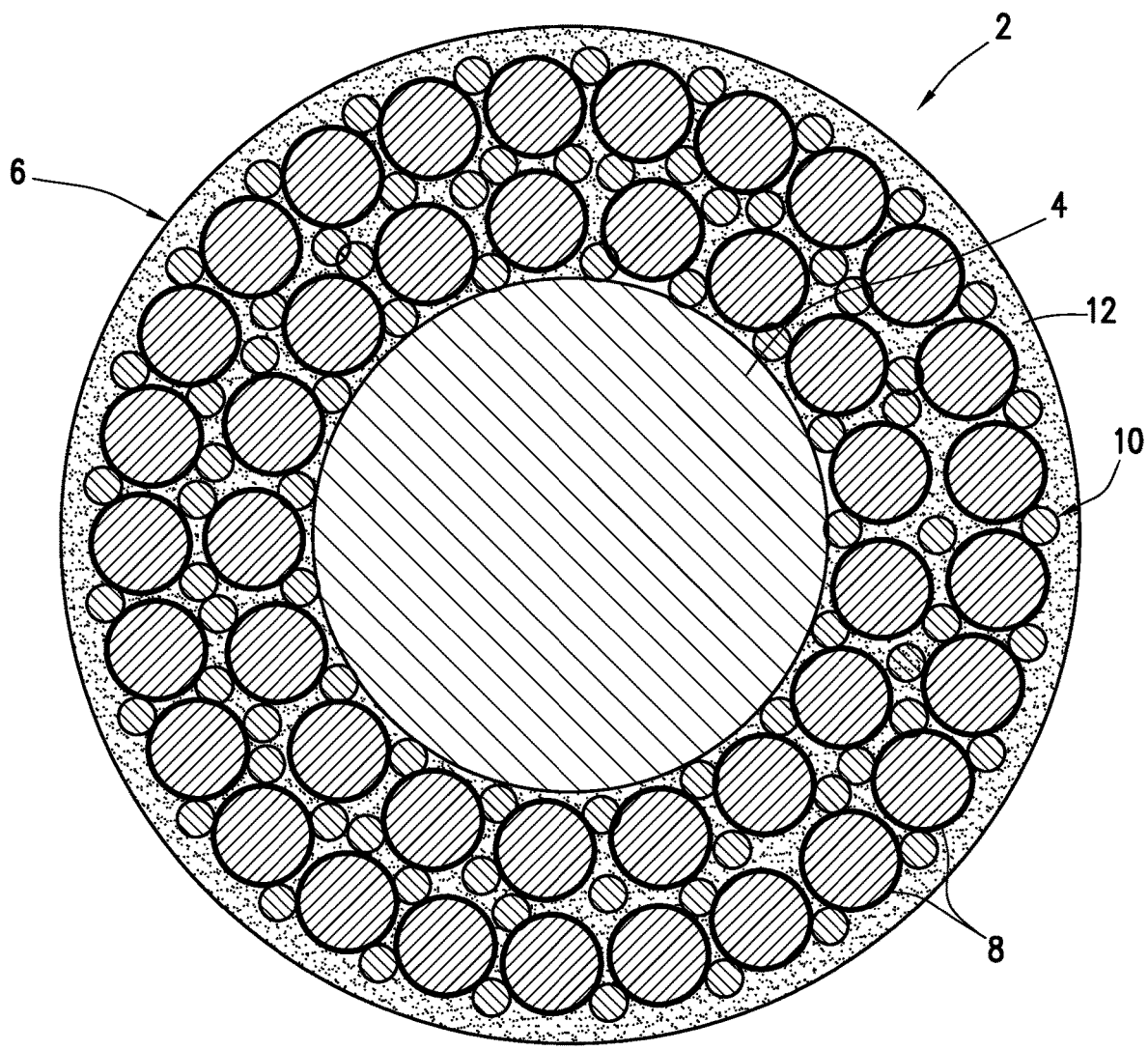
FIG. 1 is an illustration of an embodiment of the proppant provided herein.

As shown in FIG. 1, proppant 2 comprises a core substrate 4 and a light-weight substrate 6 is bound to the core substrate 4. The core substrate 4 is sometimes also referred to herein as a heavy substrate. The light-weight substrate 6 is often referred to herein as the light-weight coating or the "LWC." The light-weight substrate 6 includes: (a) a plurality of composite particles 8; (b) a filler material 10; and (c) an adhesive 12. The plurality of composite particles 8 and the filler material 10 each comprise a single type of material or can comprise two or more different types of material. The filler material 10 can be the same material as the composite particles 8 or be a different material. However, a mean particle-distribution-size of the filler material 10 is about 5 to 20 percent of the mean particular-distribution-size of the plurality of composite particles 8. The particle-distribution-size refers to a mass-weighted size distribution of a particulate material as measured from a standard sieve analysis or laser diffraction or laser diffraction analyzer. A mean particle-distribution-size refers to a mass-weighted average of a distribution of particle sizes.

The proppant 2 provided herein can be in a variety of shapes, sizes, densities, and strengths by binding a light-weight substrate 6 (or LWC) to a heavier substrate 4 (the core substrate) in specific proportions using a high-strength adhesive. The size, shape and density of the proppant 2 can be customized by varying the relative proportions of the substrates 4, 6 to enhance slurry transport, proppant strength and proppant-pack flow properties. For the proppant that is designed to be spherical or round in shape, the sphericity and roundness measurement of the proppant should be at least about 0.7 as shown on the Krumbein/Schloss chart. Alternatively, the proppant provided herein can have a rod like shape. The compressive strength and thermal stability of the proppant 2 can also be customized by varying the type of substrates and binding material used to make the proppant 2.

Applications of this new technology include hydraulic fracturing and chemical treatment of subterranean formations. They hydraulic fracturing process utilizes a fluid mixture also referred to herein as the "frac fluid," or "fracturing fluid" comprises a carrier fluid and proppant. The frac fluid is pumped into a well under pressure to induce fractures in the target geologic formation. The fractures expose more of the formation to the operator, and provide a conduit for hydrocarbons (natural gas and oil) to flow to the well bore. The specific composition of the frac fluid will vary depending on a number of factors, including depth, temperature and myriad geological considerations.

Subterranean formations are more effectively stimulated, however, by pumping proppant 2 that will travel with the carrier fluid instead of pumping heavier conventional proppants that will quickly settle out or ultra-light proppants that will float away. As used herein, the carrier fluid can be water, brine, water-based foam or hydrocarbon-based fluid. The carrier fluid is often: (1) fresh water; (2) a low-salinity brine (about 5000 ppm to 30,000 ppm salinity); or (3) high-salinity, recycled frac water (between about 50,000 ppm to 280,000 ppm salinity). The carrier fluid can also be water foamed with carbon dioxide or nitrogen or it can be a hydrocarbon-based fluid such as dead crude oil, diesel, refined mineral oil or liquefied natural gas ("LNG").

Hydraulic fracturing process often utilizes a frac fluid comprising proppant, the carrier fluid (described above) and one or more additives. As such, additives can be coated on and/or embedded in the LWC 6 of the proppant 2 to provide even a more effective chemical transport and distribution product. Chemical additives can be designed to be released over time as the proppant 2 described herein either heats up to formation temperature or the proppant 2 slowly crushes to release the additives. Additives which can be used in the light-weight coating 6 include, but are not limited to, scale inhibitors, surfactants, iron sequestrants, biocides, salt inhibitors, and/or clay stabilizers.

The subject proppant 2 are "neutrally-buoyant", or one having a specific gravity of about 1 g/cc. The proppant 2 can be transported by slickwater or other low-viscosity fluids as effectively as viscous gel fluids without the additional cost, chemicals and gel damage. The proppant 2 described herein can be kept in suspension with slickwater just like conventional proppants are kept in suspension with viscous gels. Therefore gel frac compositions can be used to estimate fluid volumes, pump rates and proppant concentrations for hydraulic fracturing with these novel proppants and slickwater.

As provided herein, specific gravity refers to as the density of a material or substance to the density of a reference material. In this application, the specific gravity of all materials is referenced to water. "Apparent specific gravity" refers to the specific gravity of a porous material where the calculated volume of the material includes the porosity. The apparent specific gravity of a porous material is always less than the actual specific gravity of the material as a solid mass.

As further provided herein, "apparent density" or "bulk density" refers to the density of a porous material where the calculated volume of the material includes the porosity. The apparent or bulk density of a porous material is always less than the actual density of the solid material.

The size of the proppant 2 can be based on the composition of the components used in the proppant 2, and the target specific gravity of the proppant 2. The proppant 2 size can be estimated by the following equations with the assumption that both the LWC 6 and the filler material 10 are spherical in shape and having a measured sphericity and roundness of 0.7 or greater as indicated on the Krumbein Sloss Chart.

| Proppant Size | $D_{prop} = [\{X_{beads} * D^3_{beads} * (SG_{LWC} + \Phi_{fill} * (SG_{resin} - SG_{fill}) + \Phi_{LWC} * SG_{fill}) + D^3_{sand} * SG_{sand}\}/SG_{prop}]^{1/3}$ $X_{beads} = (D_{sand}/D_{beads})^3 * (SG_{sand} - SG_{prop})/\{SG_{prop} - SG_{LWC} + \Phi_{LWC} * (SG_{prop} - SG_{fill}) - \Phi_{fill} * (SG_{resin} - SG_{fill})\}$ $V_{prop} = \pi/6 * D_{prop}^3$ |
|---|---|
| Definition of Variables | Prop = Calypso composite proppant<br>Core = core substrate (sand, ceramic, bauxite, etc)<br>Resin = binding material (phenolic novolac resins, furan resins, epoxy resins, etc)<br>LWC = light-weight substrate<br>Fill = Filler substrate<br>Beads = individual LWC particles<br>t = thickness (μm)<br>X = number of LWC particles<br>m = mass (lbs)<br>V = volume (cf)<br>ρ = density (lb/cf)<br>SG = specific gravity<br>$\Phi_{fill}$ = Filler porosity (%)<br>$\Phi_{LWC}$ = porosity of LWC substrate<br>π = Pi = 3.14159<br>D = particle diameter (μm) |

As described herein, the thickness of the LWC 6 can vary depending on substrates used to make the proppant 2 and the design specific gravity of the proppant 2. The thickness of the LWC 6 can be estimated by the following equations:

| | |
|---|---|
| Coating Thickness | $X_{beads} = (D_{core}/D_{beads})^3 * (SG_{prop} - SG_{core})/\{SG_{LWC} - SG_{prop} + \Phi_{LWC} * (SG_{resin} - SG_{prop})\}$<br>$D_{prop} = [\{X_{beads} * D^3_{beads} * (SG_{LWC} + \Phi_{fill} * (SG_{resin} - SG_{fill}) + \Phi_{LWC} * SG_{fill}) + D^3_{sand} * SG_{sand}\}/SG_{prop}]^{1/3}$<br>$t_{LWC} = (D_{prop} - D_{core})/2$<br>$t_{LWC} = (D_{prop} - D_{core})/(2 * D_{core})$ |

The quantities of each material used to make the proppant 2 will vary depending on the desired properties of the composite proppant. The equations to calculate the weight and volume of each material used in the composite proppant are provided by the following equations.

| | |
|---|---|
| Component Masses | $m_{prop} = m_{LWC} + m_{sand} + m_{resin} + m_{fill}$<br>$m_{prop} = V_{prop} * \rho_{prop}$<br>$m_{LWC} = V_{LWC} * \rho_{LWC}$<br>$m_{core} = V_{core} * \rho_{core}$<br>$m_{resin} = V_{resin} * \rho_{resin}$<br>$m_{fill} = V_{fill} * \rho{fill}$<br>$m_{prop} = V_{prop} * \rho_{prop} = V_{LWC} * \rho_{LWC} + V_{core} * \rho_{core} + V_{resin} * \rho_{resin} + V_{fill} * \rho{fill}$ |
| Component Volumes | $V_{LWC} = X_{beads} * V_{beads}$<br>$V_{resin} = V_{LWC} * \Phi_{fill} = X_{beads} * V_{beads} * \Phi_{fill}$<br>$V_{fill} = V_{LWC} * (\Phi_{LWC} - \Phi_{fill}) = X_{beads} * V_{beads} * (\Phi_{LWC} - \Phi_{fill})$<br>$V_{core} = \pi/6 * D_{core}^3$<br>$X_{beads} = (D_{core}/D_{beads})^3 * (SG_{prop} - SG_{core})/\{SG_{LWC} - SG_{prop} + \Phi_{LWC} * (SG_{resin} - SG_{prop})\}$<br>$V_{prop} = \{X_{beads} * V_{beads} * (SG_{LWC} + \Phi_{fill} * (SG_{resin} - SG_{fill}) + \Phi_{LWC} * SG_{fill}) + V_{sand} * SG_{sand}\}/SG_{prop}$ |

Physical properties of the subject proppant 2 depend on the materials used to make the proppant. Different types of proppant 2 can be produced to meet or exceed the anticipated formation conditions through proper selection of component materials. While extreme formation pressures and temperatures may require special materials, most stimulation applications occur at lower formation pressures and temperatures that allow the composite proppant to be made from a variety of materials. The proppant provided herein is designed to be resistant to crushing and corrosion, has a low density and can be readily available at a low cost.

The core substrate 4 can be any material having sufficient compressive strength to resist crushing or deformation under formation pressure and temperature. Compressive strength of the core substrate is preferably between about 3000 psi (pounds per square inch) to about 20,000 psi, and depends on the pressure of the formation. As described in part in the prophetic examples below, such materials can include, but are not limited to, high-purity silica sand, bauxite (aluminum oxide), kaolin-clay ceramics, diatomaceous earth, perlite, zeolite and glass. The core material 4 may be porous as long as the open voids do not compromise the compressive strength of the core substrate. Sphericity and roundness of the core substrate is preferably 0.5 or greater as indicated on the Krumbein Sloss Chart.

The light-weight coating 6 can be any material having specific gravity that is significantly less than the specific gravity of the core substrate 4. The specific gravity of the core substrate is preferably between about 2.0 g/cc to about 3.67 g/cc. The specific gravity of the LWC is between about 1.5 g/cc to about 7.5 g/cc.

Table 1 below identifies certain materials useful for the light-weight coating 6.

TABLE 1

| Light Weight Material | Specific Gravity | Apparent Specific Gravity |
|---|---|---|
| Glass Micro-spheres | 2.20 | 0.15-0.60 |
| Diatomaceous Earth | 2.30 | 0.15-0.46 |
| Expanded Perlite | 2.30 | 0.10-0.35 |
| Zeolite | 2.50 | 0.30-0.60 |

Figure 3:
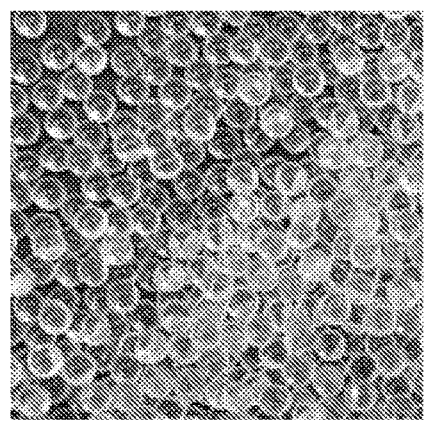
FIG. 3 is a microscopic image of an embodiment of the composite particles as glass micro-spheres.
Figure 4A:
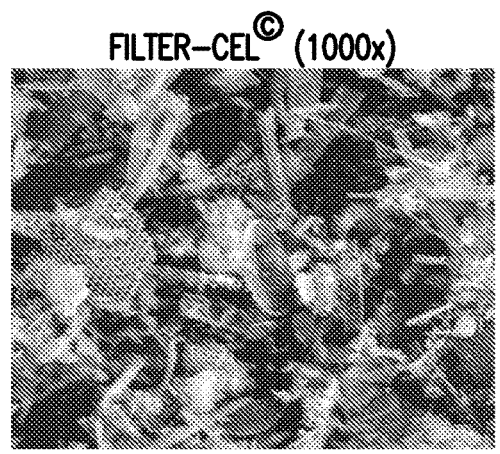
FIGS. 4A, 4B, 4C and 4D are microscopic images of diatomaceous earth under 1000× magnification.
Figure 4B:
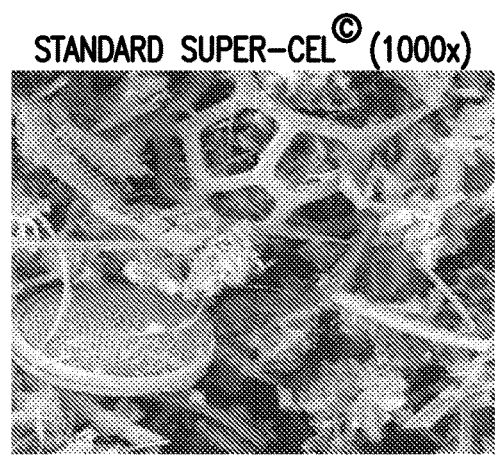
Figure 4C:
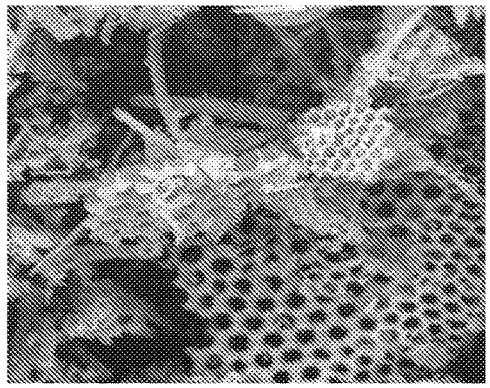
Figure 4D:
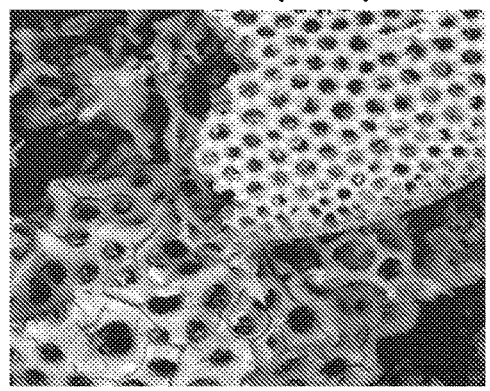

More particularly, as shown in FIG. 3, for the plurality of composite particles 8 described herein as well as the filler material 10, glass micro-spheres (micro-balloons, glass bubbles, hollow spheres, etc.) can be used. Glass micro-spheres are lightweight yet durable materials such as lightweight concrete, syntactic foam, submersibles and deep-sea oil drilling equipment. The micro-spheres are hollow, thin-walled spheres of glass that are used as a lightweight filler in composite materials, as wells as used in composites to fill polymer resins. Glass micro-spheres can range in size from 100 nanometers to 5 millimeters in diameter. Aerospace, automotive and medical industries have been using micro-spheres as lightweight filler in paints, plastics, putties, mastics, fiberglass, varnishes, resins, cements and medicines.

Likewise, for the plurality of composite particles 8 and/or the filler material 10, natural diatomaceous earth (DE) can be used. DE is the fossilized skeletal remains of phytoplankton called diatoms. DE is typically a white powdery mineral resembling chalk and it is greater than 90% amorphous silica. Calcined DE is produced when natural DE is heated to over 1000° C. (and/or chemically treated) to convert the amorphous silica to crystalline silica. The heating process drives off any water and hardens the DE structure. Calcined DE is primarily used for many filtering applications including filtering media for swimming pools. Examples of the diatomaceous earth under 1000× magnification are shown in FIGS. 4A, 4B, 4C and 4D.

Moreover, for the plurality of composite particles 8 and/or the filler material 10, perlite can be used. Perlite is formed from a volcanic magma flow of pure alumina silicate glass deposited onto the surface of the earth where the molten glass cools and subsequently hydrates water. The purity of the perlite mineral itself, and the extent to which it is intermingled with pre-existing surface materials, will vary considerably between mineral deposits.

Figure 5:
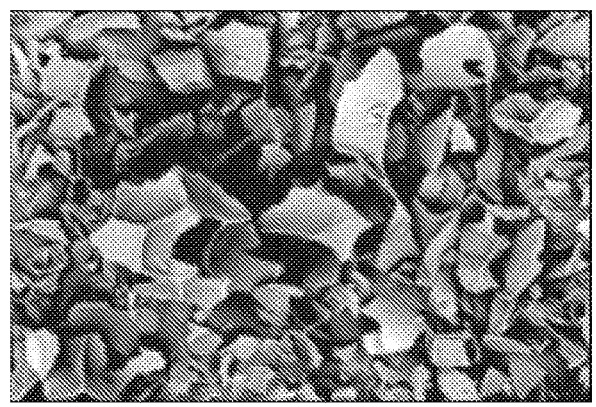
FIG. 5 is a microscopic image of an embodiment of expanded perlite under 300× magnification.

Expanded perlite is formed when granulated perlite ore is heated to about 1,600° F. to about 2,400° F. The perlite granules soften to become molten glass. The water within each perlite granule is rapidly released as steam. This process results in the virtually instantaneous formation of partially fractured, low bulk density, multi-cellular particles known as expanded perlite. Typical manufacturing processes ensure the consistent production of thin-walled particles which can be milled and/or air classified into very low density filter aids with highly predictable physical and chemical properties. Expanded perlite under 300× magnification is shown in FIG. 5.

Figure 6:
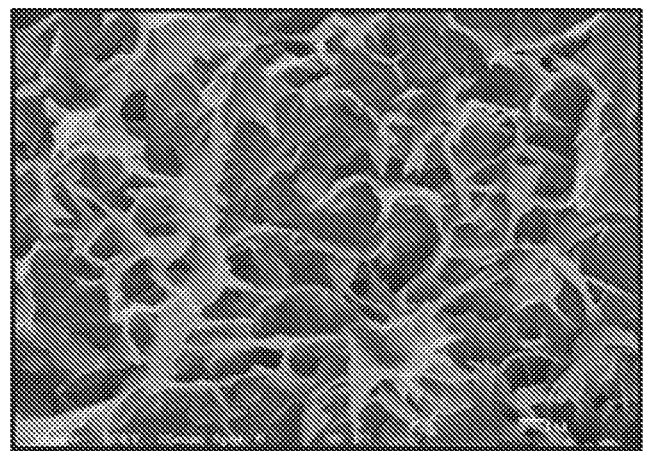
FIG. 6 is a microscopic image of an embodiment of natural zeolite.

Natural zeolites can also be used as the plurality of composite particles 8 and/or the filler material 10. Natural zeolites have a unique type of micro-porous volcanic mineral with sieving and cation exchange properties. Natural zeolite is shown in FIG. 6.

The filler material 10 can be any material with a mean particle-distribution-size ("PDS") that is approximately about 5% to about 20% of the mean particle-distribution-size of the plurality of composite particles 8. The filler material 10 fills the void spaces generated by packing the plurality of composite particles 8 together. The filler material 10 will increase the strength of the LWC when stress is applied. The filler material 10 will reduce the amount of the adhesive required to make the proppant and reduce the overall deformation of the proppant 2 under closure stress. The physical and chemical properties of the particles of the proppant 2 can change depending on the properties of the filler material 10. The filler material 10 is not required to be a light weight material since it only constitutes about 15% to about 30% of the total volume of the LWC 6. However the LWC 6 can be made thinner by the filler material 10 having a low apparent specific gravity. The filler material 10 can be, but is not limited to, one or more of the materials shown in Table 2 below.

TABLE 2

| Filler Material | Specific Gravity | Apparent Specific Gravity |
|---|---|---|
| Diatomaceous Earth | 2.30 | 0.15-0.46 |
| Perlite Flour | 2.30 | 0.10-0.35 |
| Zeolite Powder | 2.50 | 0.30-0.60 |
| Silica Flour | 2.65 | 1.75 |
| Ceramic Powder | 2.2-3.27 | 2.20-3.27 |
| Bauxite Powder | 3.61 | 3.50-3.67 |

The adhesive 12 can be any material that will effectively bind the LWC 6 to the core substrate 4. The adhesive 12 further prevents micro-particles from breaking off the proppant 2 and plugging the frac pack. The adhesive 12 can coat and protect the core substrate 4 from potential degradation from formation fluids. An adhesive 12 useful in the practice of the subject proppant 2 is a novalac phenolic resin. The adhesive 12 can be a foam as long as the voids in the foam do not significantly degrade the strength and binding properties of the adhesive 12. While novalac phenolic resin is preferred as the adhesive 12 for resin-coated proppants, other useful adhesive 12 includes polyethylene; polypropylene; styrene-isoprene-styrene (SIS); styrene-butadiene-styrene (SBS); acrylonitrile-butadiene-styrene (ABS); ethylene vinyl acetate (EVA) copolymers; polyurethanes; polyvinyl chloride (PVC) and acrylic polymers. Selection of a suitable adhesive 12 depends on a number of factors including, but not limited to: the cost of the adhesive, and formation temperature and pressure.

Generally, the proppant described herein can be made with equipment similar to that equipment used to make resin-coated proppant 2. Three exemplary methods for making the proppant 2 are provided below.

Sticky Core Process. In this method, the core substrate 4 is first mixed with a phenol resin. The resin-coated core substrate 4 is air dried for about 4 hours or until the adhesive become tacky. The plurality of composite particles 8 and filler material 10 are added to the core substrate 4 in a rotary kiln at about 150° F. and tumbled for between about 5 to 8 minutes at 16 rpm. The process of adding components is done in incremental steps to achieve the desired specific gravity of the proppant 2. The coating thickness of the LWC 6 is dictated by the tumble rate and length of time the plurality of composite particles 8 and core substrate 4 are in the rotary kiln. Once fully coated, the resin is cured at 250° F. for approximately 4 hours.

Sticky LWC Process. In this method, the filler material 10 and the plurality of composite particles 8 are first blended with the adhesive 12 in liquid form, like an epoxy or phenol resin to produce the LWC 6. The adhesive 12 is allowed to cool into a solid. The core substrate 4 is then heated to 600° F. and batch mixed the heated core substrate 4 with the light-weight substrate 6. The core substrate 4 becomes coated with the LWC 6 as the core substrate 4 contacts and melts the adhesive 12. The thickness of the LWC 6 is dictated by the tumble speed of the mixer and length of time of the core substrate 4 is in the mixer. After the core substrate 4 has been coated, the adhesive 12 is cured at 250° F. for approximately 4 hours.

Sticky Resin Process. In this method, the core substrate 4, plurality of composite particles 6 and the filler material 10 are simultaneously sprayed as a film onto a tacky or semi-solid, resin. These components are then tumbled in a rotating kiln at 250° F. for about 5 to about 8 minutes. As the adhesive 12 (resin) contacts each of these components, the proppant 2 is formed. The coating thickness of the LWC depends on the tumble rate and length of time of the core substrate 4 and composite particles 8 are in the rotary kiln. After the core substrate 4 has been sufficiently coated, the adhesive 12 is cured at 250° F. for approximately 4 hours.

The physical and chemical properties of the proppant 2 are determined from laboratory testing. Generally, the certain properties for oilfield proppant are listed below in Table 3 below.

TABLE 3

| Physical Properties | |
|---|---|
| Bulk density (lb/cf) | Color |
| Specific gravity | Crush resistance (@ closure pressure) |
| Sieve distribution | Conductivity (md-ft) |
| Sphericity | Porosity (%) |
| Roundness | Turbidity (NTU) |
| Apparent specific gravity | Color |
| Acid solubility (%) | Compressive strength (psi) |
| Turbidity (NTU) | Particle deformation (psi/psi) |

The proppant 2 provided herein can be tested in surface flow loops to determine pipe friction coefficients and slot models for proppant settling rates. Flow testing will be done in two stages. The first stage of flow testing will measure the pipe friction of a slurry of the proppant 2 in slickwater flowing through various sizes of standard oilfield tubulars at various flow rates over a range of concentrations. The pipe sizes planned to be tested are 2⅞", 3½", 4½" and 5½" tubulars. The flow rate will vary in 10 bpm increments from about 10 bpm to about 120 bpm. Friction reducer will be held at a constant concentration of about 1.0 ppt for all flow tests. The concentration of the proppant 2 in the slurry will not vary during any given flow test but will be increased in 0.5 ppa increments with each subsequent flow test to cover a test range of proppant concentrations between from about 0.5 ppa to about 8.0 ppa. The second stage of flow testing will be to measure settling rates of the proppant 2 in vertical, horizontal and multi-wing slot models. The slots in all three types of models will ¼" wide. This testing compares the settling characteristics of the subject proppant, Ottawa sand, intermediate-strength ceramic ("ISP") and bauxite proppant. Correlations of the settling rates can then be used to update existing frac models used for frac design.

The horizontal slot model tests the differences in transport of the proppant 2 over a long horizontal lateral length. The vertical slot model will be used to measure the settling rates for proppants with different apparent specific gravities and sieve sizes. The multi-wing slot model will help quantify proppant transport in complex fracture networks. The multi-wing slot model will measure the amount of proppant 2 deposited in the main channel, secondary channels and tertiary channels for different proppant types, apparent specific gravities and sieve sizes.

The majority of the cost of the proppant 2 depends on the combined cost of the materials used to make the proppant and not the manufacturing cost. Table 4 below shows a wide range in cost and compressive strength for a variety of component materials.

TABLE 4

| Materials | Cheap | Moderate | Expensive |
|---|---|---|---|
| Low Strength | — | — | Glass Micro-Spheres Resins Epoxy |
| Medium Strength | Diatomaceous Earth Expanded Perlite Silica Flour | Ottawa Sand Resin-Coated Sand Ceramic Proppant | Zeolite |
| High Strength | — | — | Bauxite Bauxite Flour |

Figure 2:
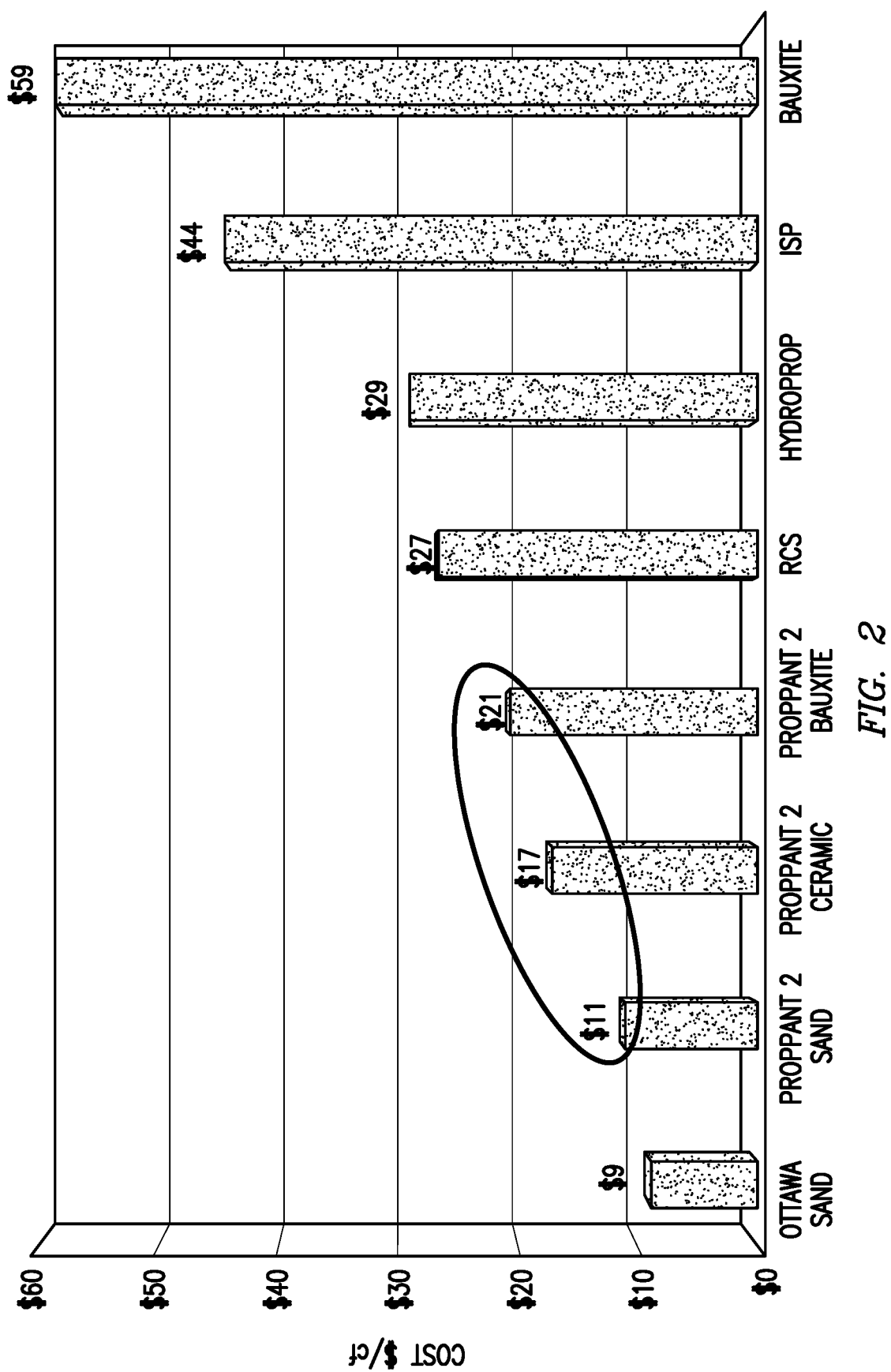
FIG. 2 is a chart depicting potential cost of making the proppants described herein in comparison to conventional proppants.

For example, the subject proppant 2 can be cost competitive with ordinary Ottawa sand or made strong enough to compete with ceramic and bauxite proppant by choosing different material components. Ottawa sand is the most common proppant used in the world today. The proppant 2 described herein can be cost competitive with Ottawa sand on a volume basis by making it with low-cost, medium-strength materials. So the base formulation for the proppant 2 will consist of Ottawa sand for the core substrate 4, diatomaceous earth or expanded perlite for the LWC 6 and a phenolic resin as the adhesive 12. Additional compressive strength can be produced by replacing the diatomaceous earth filler material with either silica flour or ceramic flour. Progressively more compressive strength can be produced by first replacing the filler material and core substrate with ceramic materials and then with bauxite. The cost of the proppant increases as the compressive strength of the proppant increases. FIG. 2 is a chart of the potential costs of making the proppant 2 described herein in comparison with existing conventional proppants.

Certain other advantages are provided by proppant 2 described herein. By using the proppant 2 in hydraulic fracturing processes, about 50% to 400% increase in hydrocarbon recovery is possible while only using about 5% to 25% of the amount of fracturing fluid required. The proppant 2 can be pumped at lower rates, with fewer pumps, to reduce air pollution and diesel consumption by about 20% to 50% in comparison with the amount of pump equipment required for current slickwater fracturing processing. The proppant 2 can also be coated or embedded with a scale inhibitor, a surfactant or other chemical additive for more effective chemical transport and distribution into the formation during hydraulic fracturing operations. In short, the proppant 2 provided herein are neutrally-buoyant in order to stimulate production from subterranean formations. The proppant 2 can also be coated or embedded with scale inhibitor, surfactants or other chemical additives for more effective chemical transport and distribution into the formation during hydraulic fracturing operations.

Furthermore, the proppant 2 provided herein is neutral weight or one having a bulk density or specific gravity of about 1.0 g/cc and used for pumping with slickwater or other low-viscosity fluids for hydraulically fracturing subterranean formations. The light-weight coating 6 can include ceramic or bauxite materials combined together with the filler material and adhesive, such as pre-cured resin, to bond to the core substrate 4 and for the purpose of providing the proppant 2 that is neutrally buoyant in water.

The core substrate 4 coated with the LWC 6 increases its buoyancy, providing for efficient proppant transportation in water. The filler material 10 that is included in the light-weight coating increases the stiffness and reduces deformation of the LWC 6 under formation stress. The filler material 10 also increases the compressive strength of the proppant and helps retain proppant pack conductivity. The filler material 10 may be the same or different material as the LWC 6.

Methods of mixing the LWC 6 with a pre-cured resin can produce a neutrally-buoyant, resin-coated proppant 2 in standard proppant mesh sizes such as 12/20, 20/40, 30/50 and 40/70 sieve sizes having the ability to be transported using fresh water, slickwater, linear gels, cross-linked gels, foams and other fracturing fluids. As noted above, the proppant 2 can also be coated or embedded with scale inhibitor, surfactants or other chemical additives to provide more effective chemical transport and distribution into the formation during hydraulic fracturing operations than from separate chemical treatments. The proppant 2 can be kept in suspension with slickwater or other low-viscosity fluids, allowing for fluids to transport the proppant 2 just as effectively as viscous gels transport conventional proppants without the additional cost, chemicals and gel damage.

The proppant 2 can be effective in complex, unconventional formations. These types of formations tend to form complex branching or dendritic fractures. The complexity of the fractures can create a tortuous path that tends to inhibit effective transport of conventional proppants. The proppant 2 described herein can travel with the slickwater as the water moves through the dendritic fractures, and do not bridge off as easily as conventional proppants until it encounters far-field micro-fractures. The proppant 2 can be optimized by starting out with smaller proppant sizes and then progressively increasing the size of the proppant as the hydraulic fracture develops. This allows the smallest proppant to enter the micro-fractures near the tip of the fractures while a larger proppant provides a higher conductivity pathway to the wellbore. As a result, the proppant 2 described herein significantly increase propped-fracture length and stimulated formation volume compared to conventional proppants.

The oil and gas industry has been working over the past 70 years to improve, enhance and refine the physical properties of fresh water to maximize proppant transport during hydraulic fracturing of subterranean formations. The two most common approaches are chemical enhancement with viscous gel systems and mechanical enhancement with high fluid velocities from high pump rates; however, the proppant really has not changed. Historically, sand, ceramic and bauxite proppants have been the most commonly pumped conventional proppants. As noted above, conventional proppants also include high-purity silica sand, resin-coated sand, and kaolin-clay ceramics. Conventional proppants also include ulta-light weight proppants such as specialty proppants developed with the intention to improve transport through a fracture compared to the conventional proppants. These specialty proppants include ultra-light-weight proppants such as thermoplastic beads and coated walnut hulls with apparent specific gravities typically ranging between about 0.35 g/cc to about 0.65 g/cc. However, specialty proppants are rarely used because of their high cost and low compressive strength. Their commercial applications are limited to shallow, low pressure formations. To compensate for their high cost, certain prior art ultra-light-weight proppants have been pumped in very low concentrations to form a single, high conductivity layer (monolayer) on top of the "proppant pack" in an effort to increase well productivity. This approach has rarely proven to be commercial. As result, the ultra-light-weight prior art proppants are rarely pumped today for stimulating subterranean formations.

There are two dominant methods or techniques for hydraulically fracturing subterranean formations. The most common frac method currently used in North America is a slickwater frac. In this method, water with a friction-reducer surfactant is pumped at between about 70 bpm to about 200 bpm with low concentrations of proppant progressively added at between about 0.1 ppa to about 4.0 ppa. The friction reducer is typically a polyacrylamide polymer added at between about 0.5 ppg to 1.0 ppg. High pump rates are required to keep the hydraulic fracture open and to transport the proppant. The proppant settles out almost immediately due to the low viscosity of the slickwater (about 1 cp to about 3 cp). As a result, the proppant starts forming a "sand dune" near the wellbore. Large volumes of frac water are required to move a small portion of the proppant from the top of the "sand dune" into the rest of the created fracture. A typical slickwater frac will pump between about 10,000 bbls to about 25,000 bbls of water and about 50,000 to about 300,000 lbs of proppant. In a horizontal well, about 20 to about 60 slickwater fracs will be pumped along the length of the lateral or horizontal section of the wellbore.

The other dominant frac method is a gel frac. In this method, a cross-linked or linear polymer is added to the water to suspend the proppant in solution while the proppant is being pumped. A chemical is then added to break down the polymer and allow it to be flowed out of the hydraulic fracture. The most common polymer used for gel fracs is a guar polymer added at about 10 ppg to about 60 pounds per gallon ("ppg"). A polyacrylamide polymer added at about 30 ppg to about 100 ppg can also be used instead of the guar polymer. A chemical is then added to cross-link the individual polymer strands together. The cross-linker increases the viscosity of the polymer to about 200 centipoise ("cp") to about 4000 cp, depending on the concentration of the polymer. A pH modifier and chemical buffer is often required for the cross-linker to work effectively. The conventional proppant is then added to the polymer producing a slurry. The high viscosity of the cross-link polymer allows the proppant to be added in progressively higher concentrations at about 0.5 pounds added per gallon ("ppa") to about 12.0 ppa. The slurry is pumped into the well while the cross-linker is activating. The cross-linked polymer keeps the proppant in suspension during fracturing operations. The suspended proppant is transported more effectively and deeper into the hydraulic fracture than is possible with a slickwater frac. A breaker chemical is then added to breakdown the cross-linked polymer and allow the polymer be recovered during flowback operations.

A typical gel frac will pump between about 1500 barrels ("bbls") to about 2500 bbls of water and between about 50,000 to about 600,000 lbs of proppant. Gel fracs are typically able to pump significantly more proppant in higher concentrations than slickwater fracs. As a result, gel fracs are more frequently used in oil formations and slickwater fracs are more frequently used in gas formations. Despite superior proppant transport, gel fracs have two major drawbacks. Gel fracs are typically more expensive than slickwater fracs due to the amount of chemicals needed to create and then break the cross-linked polymer. Incomplete breakdown and recovery of the cross-linked polymer often damages the hydraulic fracture. The gel damage in the fracture increases with distance away from the wellbore, limiting the effective length of the fracture.

A conventional gel-frac composition of slickwater and one of more of the subject proppant 2 can be used to estimate fluid volumes, pump rates and proppant concentrations for a hydraulic frac. This design can be used to estimate the benefits of using the subject proppant compared to existing slickwater and viscous gel fracture designs. The primary benefits of the proppant 2 provided herein include between about a 50% to 400% increase in hydrocarbon recovery by increasing the propped drainage volume while only using between about 5% to about 25% of the amount of frac water currently used with current slickwater fracs. In addition, the subject proppant 2 can be pumped at lower rates, with fewer frac pumps and thereby reducing air pollution and diesel consumption by between about 20% to 50% compared with current slickwater frac jobs. The wellsite may also be downsized by about 10% to 30% due to fewer frac pumps and less water storage. Thereby reducing the amount of land required for oil, gas and water operations.

Prophetic examples of the proppant 2 described herein are provided below.

EXAMPLE 1

Sand and Diatomaceous Earth

In an embodiment, the proppant comprises the core substrate 4 of high purity silica (sand) and the LWC 6 having a plurality of composite particles 8 of calcined diatomaceous earth ("CDE") bound to the core substrate 4 with the adhesive 12 comprising phenolic resin. The particle size distribution range of the composite particles 8 can be between about 10 to about 40 µm as preferred for CDE. The thickness of the light-weight coating 6 can be about 25% to about 35% of the thickness (diameter) of the core substrate 4 to provide the proppant 2 with a neutral-buoyancy property. The resin can be between about 20% to about 25% of the volume of the LWC. Here, the proppant 2 can be used in formations with closure stress less than about 4,000 psi. This amount of the resin makes the proppant 2 flexible and deformable under high closure stresses.

EXAMPLE 2

Diatomaceous Earth and Silica Flour

The compressive strength of the proppant 2 described in Example 1 can be increased by filling available pore space in the LWC 6 with silica flour as the filler material 10. The silica flour can decrease the porosity between the plurality of composite particles 8 from about 25% to about 30% to about 3% to about 8% with a corresponding decrease in the amount of the resin required to bind the LWC 6 to the core substrate 4. The particle size distribution range for the filler material (silica flour) can be between about 1 to about 10 µm to fill pore space between the composite particles. The thickness of the LWC 6 can be increased to about 55% to about 65% of the thickness of the core substrate 4 in order to make the proppant 2 have neutral buoyancy. Adding silica flour can also increase the compressive strength and decrease deformation of the proppant 2. In this case, the proppant 2 can be applicable for use in formations with closure stress less than 6,000 psi.

EXAMPLE 3

ISP with Diatomaceous Earth and Ceramic Powder

The compressive strength of the proppant 2 described in Example 2 can be increased by: (1) replacing kaolin-clay ceramic material as the core substrate 4; and (2) replacing silica flour as the filler material 10 in the LWC 6 with ceramic powder as the filler material 10. Ceramic powder can have a similar range of size as silica flour in Example 2. Ceramic powder can reduce porosity of the LWC to about 3% to about 8%, just like silica flour. The thickness of the LWC 6 can increase to about 110% to about 120% of the thickness of the core substrate to make the proppant 2 have neutral buoyancy. Adding the ceramic components can increase the cost and the compressive strength of the proppant 2. Here, the proppant 2 can be used in formations with closure stresses between about 6,000 to about 10,000 psi.

EXAMPLE 4

Bauxite with Diatomaceous Earth and Bauxite Powder

The compressive strength of the proppant 2 described in Example 3 can be increased by: 1) replacing ceramic material as the core substrate 4 with bauxite material as the core substrate 4; and 2) replacing ceramic powder as the filler material 10 in the LWC 6 with bauxite powder as the filler material 6. Bauxite powder can have a similar size range as the ceramic powder in Example 3. Bauxite powder can reduce the porosity of the LWC 6 to between about 3% to about 8%. The thickness of the LWC 6 can increase to between about 250% to about 300% of the thickness of the core substrate 4 to make the proppant 2 have neutral buoyancy. The core substrate 4 can have a mesh size of between about 100 to about 400 mesh, or about 35 to about 150 microns or nanometers ("μm"). This core substrate 4 can then be used to make the proppant 2 of 20/40, 30/50, 40/70 mesh. Adding the bauxite components can increase the cost and the compressive strength of the proppant 2. Here, the proppant 2 can be used in formations with closure stresses between about 10,000 psi to about 14,000 psi.

EXAMPLE 5

Diatomaceous Earth

In an embodiment, the core substrate 4, the plurality of composite particles 8 and the filler material 10, each comprise broad-sieved calcined diatomaceous earth (CDE) bound to the core substrate 4 with phenolic resin as the adhesive 12. The plurality of composite particles 8 having a particle size distribution range of between about 1 to about 30 μm for the LWC 6. The light-weight coating thickness can be between about 8% to about 11% of the thickness of the core substrate to make the proppant with neutral buoyancy. Resin as the adhesive 12 can be 3%-8% of the volume of the LWC. The core substrate can be heated to 2400° F. for approximately 4 hours to produce the core substrate having specific gravity of about 1.3 to about 1.5 g/cc. Here, the proppant can be used in formations with closure stresses less than 6000 psi and can be made with conventional resin-coating manufacturing processes.

EXAMPLE 6

Sand and Perlite

In an embodiment, the core substrate 4 comprises high purity silica (sand) and the LWC 6 comprises expanded perlite bound to the core substrate 4 with phenolic resin as the adhesive 12. The plurality of composite particles 8 can have a broad-sieved, particle size distribution range of between about 1 to about 30 μm. The thickness of the light-weight coating 6 can be about 20% to about 25% of the thickness of the core substrate 4 to make the proppant 2 having neutral buoyancy. The resin 12 can be about 3% to about 8% of the volume of the LWC 6. Here, the proppant 2 can be used in formations with closure stresses less than about 5000 psi. This example teaches that a variety of natural raw materials can be used to make the proppant 2.

EXAMPLE 7

Sand and Glass Micro-Spheres

In an embodiment, the proppant 2 includes the core substrate 4 of high purity silica (sand) and the LWC 6 comprises glass micro-spheres 8 bound to the core substrate 4 with phenolic resin as the adhesive 12. The plurality of composite particles 8 have a mean particle size distribution range of between about 20 to about 40 μm for the glass micro-spheres ("glass beads"). The thickness of the light-weight coating 6 can be between about 20% to about 25% of the thickness of the core substrate 4 to make the proppant 2 with neutral buoyancy. The resin can be about 25% to about 35% of the volume of the LWC 6. Here, the proppant 2 can be used in formations with closure stress less than about 4000 psi. High resin content can make the proppant 2 flexible and deformable under high closure stresses.

EXAMPLE 8

Porous Ceramic with Diatomaceous Earth and Ceramic Powder

In an embodiment, the proppant 2 comprises the core substrate 4 having a lower-density, porous ceramic material and the plurality of composite particles 8 are CDE bound to the core substrate 4 with phenolic resin as the adhesive 12. The core substrate can have specific gravity of about 1.4 to about 2.4 g/cc. As a result, it can require the thickness of the LWC 6 to be about 10% to about 25% of the thickness of the core substrate 4 in order to make the proppant 2 with neutral buoyancy. The plurality of composite particles 8 have a particle size distribution range of between about 10 to about 40 μm. Ceramic powder can be used as the filler material 10. The filler material 10 can have a particle size distribution range of between about 1 to about 10 μm. The ceramic powder can reduce the porosity of the LWC to about 3% to about 8%. Adding the ceramic components can increase the cost and the compressive strength of the proppant 2. Here, the proppant 2 can be used in formations with closure stresses between about 7,000 to about 9,000 psi.

EXAMPLE 9

Thermo-Plastic Resin

In an embodiment, the proppant 2 comprises the core substrate 4, the LWC 6 and the filler material 10 bound together with thermo-plastic resin as the adhesive 12. Composition and size of the plurality of composite particles 8 and the filler material 10 can be similar to those described in the previous Examples 1 to 8. However, the thermo-plastic resin provides a more rigid and stronger proppant 2 than when phenolic resin is used as the adhesive 12. The thermo-plastic resin can also increase the cost of the proppant 2. Here, the proppant 2 can be used in formations with closure stresses between about 8,000 to about 12,000 psi.

EXAMPLE 10

Calculating Proppant Size for Sand, Diatomacceous Earth and Perlite

In an embodiment, and as shown in FIG. 7A, the core substrate 4 comprises high purity silica (sand), the plurality of composite particles 8 comprise diatomaceous earth and the filler material 10 comprise perlite bound to the core substrate by resin as the adhesive 12. In this embodiment and the embodiment set out below in Examples 11 and 12, the size of the proppant 2 can be calculated having the input data of Table 5 and the output data of in Table 6. The proppant sizes and coating thickness are provided in Table 7 below.

TABLE 5

| Input Data | |
|---|---|
| | $SG_{prop}$ = 1.00 (0.70-2.00) |
| | $SG_{core}$ = 2.65 (2.55-3.61) |
| | $SG_{resin}$ = 1.12 (1.09-1.17) |
| | $SG_{LWC}$ = 0.46 (0.30-0.60) |
| | $SG_{filler}$ = 0.20 (0.30-2.20) |
| | Mean $D_{LWC}$ = 20.0 (μm) |
| | $\Phi_{LWC}$ = 25% (5%-48%) |
| | $\Phi_{w/filler}$ = 5% (3%-18%) |

TABLE 6

| | Core Mesh Size | | | | | |
|---|---|---|---|---|---|---|
| | 20 | 40 | 50 | 70 | 100 | 150 |
| Composite Particles | 176,776 | 19,020 | 7,786 | 2,752 | 983 | 291 |
| Core Substrate Size μm | 841 | 400 | 297 | 210 | 149 | 99 |

TABLE 6-continued

| | Core Mesh Size | | | | | |
|---|---|---|---|---|---|---|
| | 20 | 40 | 50 | 70 | 100 | 150 |
| Proppant Size μm | 1332 | 633 | 470 | 333 | 236 | 157 |
| Proppant Mesh Size | 15 | 29 | 37 | 47 | 64 | 95 | where $$X_{beads} = (D_{core}/D_{beads})^3 * (SG_{core} - SG_{prop})/\{SG_{prop} - SG_{LWC} + \Phi_{LWC} * (SG_{prop} - SG_{fill}) - \Phi_{fill} * (SG_{resin} - SG_{fill})\}$$

$$D_{prop} = [\{X_{beads} * D^3_{beads} * (SG_{LWC} + \Phi_{fill} * (SG_{resin} - SG_{fill}) + \Phi_{LWC} * SG_{fill}) + D^3_{core} * SG_{core}\}/SG_{prop}]^{1/3}$$

EXAMPLE 11

Intermediate Strength Ceramic, Diatomaceous Earth and Ceramic Flour

In an embodiment and as shown in FIG. 7B, the core substrate 4 comprises intermediate strength ceramic, the plurality of composite particles 8 comprise diatomaceous earth and the filler material 10 comprise ceramic flour to the core substrate 4 by resin as the adhesive 12. In this embodiment, the size of the proppant 2 can be calculated having the input data of Table 5 and the output data of in Table 6. The sizes and coating thickness of the resulting proppant 2 are provided in Table 7 below.

EXAMPLE 12

Bauxite and Diatomaceous Earth

In an embodiment and as shown in FIG. 7C, the core substrate 4 comprises bauxite, the plurality of composite particles 8 comprise diatomaceous earth and the filler material 10 comprises bauxite filler bound to the core substrate 4 by resin as the adhesive 12. In this embodiment, the size of the proppant 2 can be calculated having the input data of Table 5 and the output data of in Table 6.

The sizes and coating thickness of the proppant 2 are provided in Table 7 below. The proppant 2 of prophetic Example 10 (above) is labeled in Table 7 as the Sand Substrate and depicted in FIG. 7A. The proppant 2 of prophetic Example 11 (above) is labeled in Table 7 as the Ceramic Substrate and depicted in FIG. 7B. The proppant 2 of prophetic Example 12 (above) is labeled as the Bauxite Substrate and depicted in FIG. 7C.

TABLE 7

| Target Specific Gravity and Various Sizing | | | | | | | | | | |
|---|---|---|---|---|---|---|---|---|---|---|
| Target Proppant SG | 1.00 | 1.00 | 1.20 | 1.50 | 2.00 | 0.80 | 1.00 | 1.20 | 1.50 | 2.00 |
| Sand Substrate | | | | | | | | | | |
| Core SG | 2.65 | 2.65 | 2.65 | 2.65 | 2.65 | 2.65 | 2.65 | 2.65 | 2.65 | 2.65 |
| Resin SG | 1.12 | 1.12 | 1.12 | 1.12 | 1.12 | 1.12 | 1.12 | 1.12 | 1.12 | 1.12 |
| LWC SG | 0.46 | 0.46 | 0.46 | 0.46 | 0.46 | 0.60 | 0.60 | 0.60 | 0.60 | 0.60 |
| Filler SG | 0.46 | 0.46 | 0.46 | 0.46 | 0.46 | 0.46 | 0.46 | 0.46 | 0.46 | 0.46 |
| LWC Porosity | 25% | 25% | 30% | 35% | 40% | 20% | 25% | 30% | 35% | 40% |
| Filler Porosity | 5% | 5% | 8% | 10% | 15% | 3% | 5% | 8% | 10% | 15% |
| LWC Particle Size (μm) | 10 | 10 | 15 | 20 | 30 | 5 | 10 | 15 | 20 | 30 |
| Core Mesh Size | 40 | 40 | 40 | 40 | 40 | 70 | 70 | 70 | 70 | 70 |
| LWC Particles | 164,486 | 164,486 | 30,242 | 6,876 | 749 | 552,227 | 30,440 | 5,173 | 1,111 | 116 |
| Core Substrate Size (μm) | 400 | 400 | 400 | 400 | 400 | 210 | 210 | 210 | 210 | 210 |
| Calypso Prop Size (μm) | 646 | 646 | 582 | 517 | 452 | 452 | 362 | 317 | 277 | 239 |
| Calypso Prop Mesh Size | 28 | 28 | 31 | 35 | 38 | 38 | 45 | 49 | 55 | 63 |
| Coating Thickness (μm) | 123 | 123 | 91 | 59 | 26 | 121 | 76 | 54 | 34 | 15 |
| Coating Thickness (% Core) | 31% | 31% | 23% | 15% | 6% | 58% | 36% | 26% | 16% | 7% |

TABLE 7-continued

Target Specific Gravity and Various Sizing

| Target Proppant SG | 1.00 | 1.00 | 1.20 | 1.50 | 2.00 | 0.80 | 1.00 | 1.20 | 1.50 | 2.00 |
|---|---|---|---|---|---|---|---|---|---|---|
| Ceramic Substrate | | | | | | | | | | |
| Core SG | 3.27 | 3.27 | 3.27 | 3.27 | 3.27 | 3.27 | 3.27 | 3.27 | 3.27 | 3.27 |
| Resin SG | 1.12 | 1.12 | 1.12 | 1.12 | 1.12 | 1.12 | 1.12 | 1.12 | 1.12 | 1.12 |
| LWC SG | 0.46 | 0.46 | 0.46 | 0.46 | 0.46 | 0.60 | 0.60 | 0.60 | 0.60 | 0.60 |
| Filler SG | 0.46 | 0.46 | 0.46 | 0.46 | 0.46 | 0.46 | 0.46 | 0.46 | 0.46 | 0.46 |
| LWC Porosity | 20% | 25% | 30% | 35% | 40% | 20% | 25% | 30% | 35% | 40% |
| Filler Porosity | 3% | 5% | 8% | 10% | 15% | 3% | 5% | 8% | 10% | 15% |
| LWC Particle Size (μm) | 5 | 10 | 15 | 20 | 30 | 5 | 10 | 15 | 20 | 30 |
| Core Mesh Size | 40 | 40 | 40 | 40 | 40 | 70 | 70 | 70 | 70 | 70 |
| LWC Particles | 1,850,111 | 226,293 | 43,173 | 10,583 | 1,463 | 737,298 | 41,877 | 7,384 | 1,710 | 227 |
| Core Substrate Size (μm) | 400 | 400 | 400 | 400 | 400 | 210 | 210 | 210 | 210 | 210 |
| Calypso Prop Size (μm) | 699 | 703 | 633 | 563 | 492 | 493 | 395 | 347 | 303 | 261 |
| Calypso Prop Mesh Size | 26 | 26 | 29 | 32 | 36 | 36 | 41 | 46 | 50 | 58 |
| Coating Thickness (μm) | 149 | 151 | 116 | 81 | 46 | 142 | 92 | 68 | 46 | 26 |
| Coating Thickness (% Core) | 37% | 38% | 29% | 20% | 12% | 67% | 44% | 33% | 22% | 12% |
| Bauxite Substrate | | | | | | | | | | |
| Core SG | 3.61 | 3.61 | 3.61 | 3.61 | 3.61 | 3.61 | 3.61 | 3.61 | 3.61 | 3.61 |
| Resin SG | 1.12 | 1.12 | 1.12 | 1.12 | 1.12 | 1.12 | 1.12 | 1.12 | 1.12 | 1.12 |
| LWC SG | 0.46 | 0.46 | 0.46 | 0.46 | 0.46 | 0.60 | 0.60 | 0.60 | 0.60 | 0.60 |
| Filler SG | 0.46 | 0.46 | 0.46 | 0.46 | 0.46 | 0.46 | 0.46 | 0.46 | 0.46 | 0.46 |
| LWC Porosity | 20% | 25% | 30% | 35% | 40% | 20% | 25% | 30% | 35% | 40% |
| Filler Porosity | 3% | 5% | 8% | 10% | 15% | 3% | 5% | 8% | 10% | 15% |
| LWC Particle Size (μm) | 5 | 10 | 15 | 20 | 30 | 5 | 10 | 15 | 20 | 30 |
| Core Mesh Size | 40 | 40 | 40 | 40 | 40 | 70 | 70 | 70 | 70 | 70 |
| LWC Particles | 2,127,221 | 260,187 | 50,265 | 12,616 | 1,855 | 838,788 | 48,150 | 8,597 | 2,039 | 288 |
| Core Substrate Size (μm) | 400 | 400 | 400 | 400 | 400 | 210 | 210 | 210 | 210 | 210 |
| Calypso Prop Size (μm) | 726 | 730 | 658 | 585 | 512 | 513 | 411 | 361 | 315 | 272 |
| Calypso Prop Mesh Size | 25 | 25 | 28 | 31 | 35 | 35 | 40 | 45 | 49 | 56 |
| Coating Thickness (μm) | 163 | 165 | 129 | 93 | 56 | 152 | 101 | 75 | 53 | 31 |
| Coating Thickness (% Core) | 41% | 41% | 32% | 23% | 14% | 72% | 48% | 36% | 25% | 15% |

We claim:

1. A proppant for use in hydraulic fracturing comprising:
a core substrate having compressive strength of between about 3,000 psi and about 20,000 psi; and
a light-weight substrate comprising a plurality of composite particles selected from the group of glass micro-spheres, diatomaceous earth, expanded perlite and/or zeolite and having a particle-distribution-size; a filler material selected from the group of diatomaceous earth, perlite flour, zeolite powder, silica flour, ceramic powder and/or bauxite powder; and an adhesive, wherein the filler material having between about 5 percent to about 20 percent of the particle-distribution-size of the plurality of composite particles, the adhesive binding the light-weight substrate to the core substrate, and the proppant having a specific gravity of about 1 g/cc.

2. The proppant of claim 1, wherein the adhesive is a resin or foam.

3. The proppant of claim 1, further comprising an additive combined with the filler material, plurality of composite particles and the adhesive.

4. The proppant of claim 3, wherein the additive is a phenolic resin.

5. The proppant of claim 1, wherein the plurality of composite particles are glass microspheres.

6. The proppant of claim 1, wherein the filler material is perlite.

7. A light-weight coating suitable for use on a core substrate comprising a plurality of composite particles selected from the group of glass micro-spheres, diatomaceous earth, expanded perlite and/or zeolite and having a particle-distribution-size; a filler material selected from the group of diatomaceous earth, perlite flour, zeolite powder, silica flour, ceramic powder and/or bauxite powder and having between about 5 percent to about 20 percent of the particle-distribution-size of the plurality of composite particles; and an adhesive wherein the light-weight coating is combined with the core substrate to provide a proppant wherein the proppant has a specific gravity of about 1.0 g/cc.

8. A proppant useful in hydraulic fracturing having a specific gravity of about 1.0 g/cc comprising a light-weight substrate and a core substrate, the light-weight substrate having a specific gravity of significantly less than the core substrate wherein the light-weight substrate comprises a plurality of composite particles having a particle-distribution-size and selected from the group of glass micro-spheres, diatomaceous earth, expanded perlite and/or zeolite bound to the core substrate by an adhesive and a filler material, wherein the filler material selected from the group of diatomaceous earth, perlite flour, zeolite powder, silica flour, ceramic powder and/or bauxite powder and having between about 5 percent to about 20 percent of the particle-distribution-size of the plurality of composite materials.

9. The proppant of claim 8, wherein the plurality of composite particles and the filler material are each diatomaceous earth.

10. The proppant of claim 8, wherein the plurality of composite particles are glass micro-spheres.

11. A method of making the proppant of claim 1, comprising the steps of:
providing a core substrate having a compressive strength of between about 3,000 psi and about 20,000 psi;
mixing the core substrate with an adhesive to produce a resin-coated substrate;

drying the resin coated substrate until the adhesive becomes tacky; and mixing a plurality of composite particles and a filler material incrementally with the resin coated substrate to produce the proppant.

12. A method of making the proppant of claim 1, comprising the steps of:

mixing the plurality of composite particles and filler material with an adhesive to produce a light-weight coating;

providing a core substrate;

heating the core substrate to 600° F.;

mixing the heated core substrate with the light-weight coating; and curing the adhesive at 25020 F. for approximately 4 hours.

13. A method of making the proppant of claim 1, comprising the steps of:

spraying simultaneously a core substrate, a plurality of composting particles, and a filler material onto an adhesive to produce a sticky resin; and tumbling the sticky resin in a rotating kiln at 250° F. for about 5 to about 8 minutes to form the proppant.

14. A frac fluid comprising the proppant of claim 1.

* * * * *